(12) United States Patent
Ikeda et al.

(10) Patent No.: US 6,273,476 B1
(45) Date of Patent: Aug. 14, 2001

(54) FLEXIBLE EXPANSION JOINT

(75) Inventors: Shintaro Ikeda; Yuji Noda, both of Kusatsu; Yoshihiko Sugiyama, Shiga-ken, all of (JP)

(73) Assignee: The Victaulic Company of Japan Limited, Tokyo (JP)

( * ) Notice: Subject to any disclaimer, the term of this patent is extended or adjusted under 35 U.S.C. 154(b) by 0 days.

(21) Appl. No.: 09/194,774

(22) PCT Filed: Jun. 11, 1997

(86) PCT No.: PCT/JP97/02019

§ 371 Date: Dec. 21, 1998

§ 102(e) Date: Dec. 21, 1998

(87) PCT Pub. No.: WO97/47909

PCT Pub. Date: Dec. 18, 1997

(30) Foreign Application Priority Data

Jun. 11, 1996 (JP) .................................................. 8-170691
Dec. 5, 1996 (JP) .................................................. 8-339119

(51) Int. Cl.[7] .................................................. F16L 27/00
(52) U.S. Cl. .................................... 285/146.1; 285/145.3
(58) Field of Search ........................... 285/145.1, 145.3, 285/146.1, 181, 302, FOR 147, FOR 148

(56) References Cited

U.S. PATENT DOCUMENTS

| | | | |
|---|---|---|---|
| 2,209,239 | * | 7/1940 | Sterzenbach ...................... 285/302 X |
| 2,381,426 | * | 8/1945 | Allen et al. ........................ 285/146.1 |
| 2,815,973 | * | 12/1957 | Jackson ................................. 285/181 |
| 3,515,414 | * | 6/1970 | Kowalewski ....................... 285/145.3 |
| 3,754,779 | * | 8/1973 | Peress ............................. 285/146.1 X |
| 3,951,418 | * | 4/1976 | Dryer ................................ 285/302 X |
| 4,776,617 | * | 10/1988 | Sato ................................... 285/145.3 |
| 5,740,839 | * | 4/1998 | Kuo et al. ...................... 285/145.3 X |
| 5,897,146 | * | 4/1999 | Saito et al. ......................... 285/145.3 |

FOREIGN PATENT DOCUMENTS

| | | | |
|---|---|---|---|
| 1811156 | * | 6/1970 | (DE) ............................. 285/FOR 147 |
| 729162 | * | 7/1932 | (FR) ............................. 285/FOR 148 |
| 2066399 | * | 7/1981 | (GB) ..................................... 285/93 |
| 25-9638 | | 11/1950 | (JP) . |
| 59-94687 | | 6/1984 | (JP) . |
| 64-7275 | | 2/1989 | (JP) . |
| 3-93679 | | 9/1991 | (JP) . |
| 679767 | * | 8/1979 | (SU) ............................. 285/FOR 148 |

* cited by examiner

*Primary Examiner*—Lynne H. Browne
*Assistant Examiner*—David E. Bochna
(74) *Attorney, Agent, or Firm*—Frishauf, Holtz, Goodman, Langer & Chick, P.C.

(57) ABSTRACT

Hollow spherical portions 3 and 4 respectively formed on both tubes 1 and 2 so provided as to face to each other are fitted to each other inside and outside and the faced tubes 1 and 2 are coupled so that they can mutually bend. Packings 5 and 5*a* in which a recessed portion is formed from the side in section are provided between the open ends 4*a* of the hollow spherical portions 3 and 4 fitted outside and the outside face of the hollow spherical portion 3 fitted inside. A lip portion 7 formed at least on one side of the recessed portion is joined to the open end face of the hollow spherical portion 4 fitted outside. And a holding member 9 provided to the open end face 4*a* of the hollow spherical portion 4 fitted outside is joined to the packings 5 and 5*a*.

4 Claims, 4 Drawing Sheets

FLEXIBLE EXPANSION JOINT

TECHNICAL FIELD

The present invention relates to an extensible flexible joint and provides a novel mechanism for reliably achieving an extension flexibility action of an extensible flexible joint using a spherical surface, which is superior in durability, and moreover which adequately prevents a bending force from occurring even if a pressure is exerted on the bent portion under a condition when the joint is used.

BACKGROUND ART

Methods for coupling conduits to each other by providing them with a large flexibility have been proposed so far and they are practically used. To secure the flexibility, it is advantageous to use a spherical portion so as to obtain a relatively large flexibility. That is, tubes having ends on which hollow spherical portions are formed so as to be fitted to each other inside and outside are used. The hollow spherical portions are fitted and coupled to each other, a holding portion body is provided to the outside spherical portion, and the inside spherical portion is rotatably held between the outside spherical portion and the holding portion body.

Moreover, by using a set of above flexible joints and slidably coupling the tubes at the joints to each other, an extensible portion between tubes is formed between the above described flexible portions on both sides to obtain not only flexibility but also extensibility. In this case, it is possible to provide flexibility and extensibility to conduits connected to both ends of the joint mechanism while they are parallel.

The above conventional flexible joint and flexible extensible joint have an advantage that a large flexibility and extensibility are obtained. However, because these joints flexibly extend or contract while securing an accurate sealing condition by a sealing material between the above flexible portion and extensible portion, the accuracy of the sealing condition is proportional to the tightness of the sealing material and a considerable frictional resistance is inevitably produced when the joint actually flexibly extends or contracts. Therefore there is a disadvantage that actual flexible extension or contraction is not smoothly performed due to the frictional resistance of the sealing material.

In the case of the conventional joints described above, it is essential to securely and tightly seal the sealing material in order to tightly couple those portion bodies. Therefore, such coupling cannot be sufficiently obtained or leakage may occur when the coupling is inaccurate. Moreover, the sufficiently tightened sealing material has a disadvantage that it is aged or deformed and adequate durability is hardly obtained.

When the above extensible flexible joint is used as a bent tube, the joint is extended due to the pressure of the fluid circulating through the tube. Moreover, when the joint is led from a fixed portion 28 and connected so as to form a bent conduit 26 as shown in FIG. 7, an unnecessary bending force is produced in a conduit portion body 27 as shown by imaginary lines and a deformed portion 27 is formed on the conduit or the conduit is cracked or broken.

DISCLOSURE OF INVENTION

The present invention achieves stable flexible and extending actions and a high durability as a result of continuous study on how to solve the above problems of conventional joints, using a specific sealing material, forming an adequate stopper portion, and simply and accurately establishing preferable conditions as an extensible flexible joint. Hollow spherical portions formed at the ends of both opposed tubes are fitted to each other inside and outside and coupled to each other so that they can be mutually bent, a packing in which a recessed portion is formed from the side in section is provided between the open end of the hollow spherical portion fitted outside and the outside face of the hollow spherical portion fitted inside, a lip portion formed at least on one side of the recessed portion is joined to the open end face of the hollow spherical portion fitted outside, and a holding member provided to the open end of the hollow spherical portion fitted outside is joined to the packing.

BEST MODE CARRYING OUT OF THE INVENTION

Figure 1:
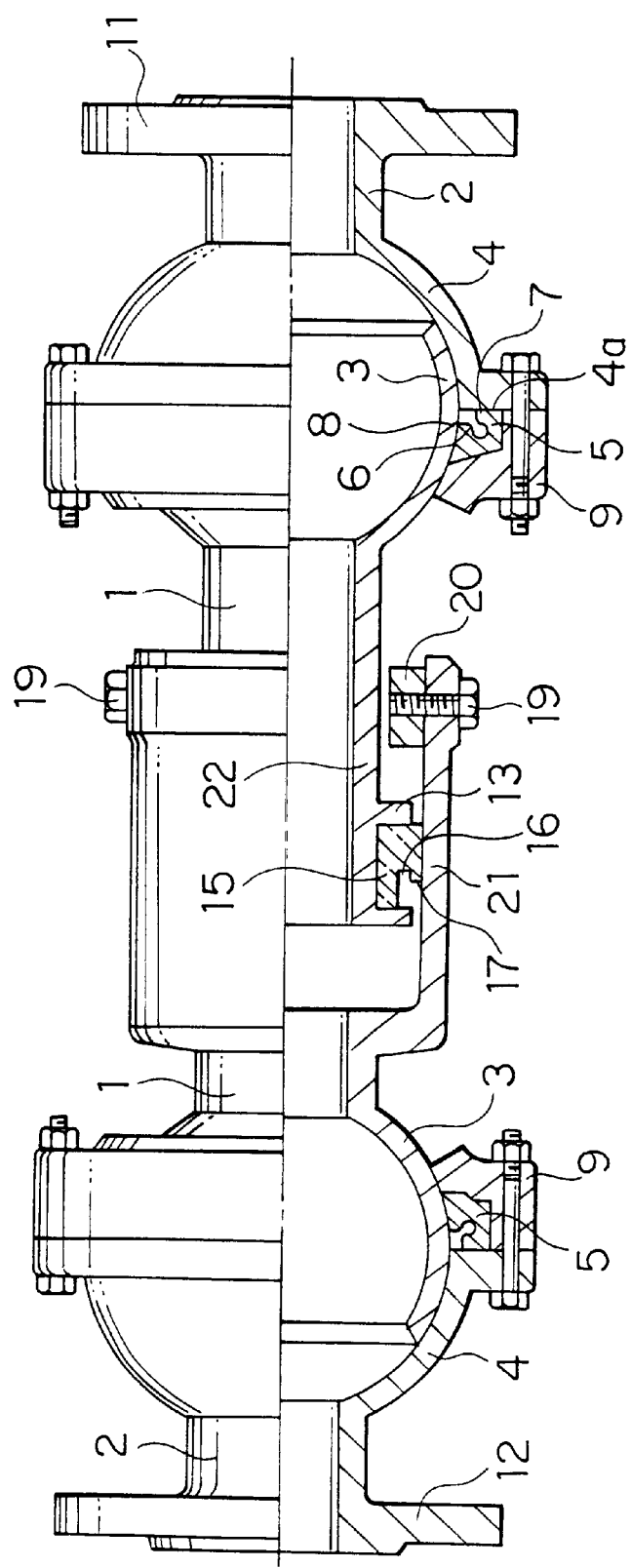
FIG. 1 is a side view showing a partly-cut-out extensible flexible joint of the present invention.

The preferred embodiments of the present invention will be described below referring to the accompanying drawings. In the case of the present invention, as a first embodiment, the fact that hollow spherical portions 3 and 4 are respectively formed at the ends of tubes 1 and 2 provided so as to face to each other and these hollow spherical portions 3 and 4 are fitted inside and outside so that the tubes 1 and 2 are coupled so that they can be mutually bent is the same as the above-described conventional joint mechanism for securing flexibility, and the gap between the hollow spherical portions 3 and 4 fitted inside and outside is sealed with a packing 5. The present invention uses a specific packing as the above packing 5 and assembles it in a specific relation.

That is, the packing 5 formed as a cross-section hollow portion 6 is provided between the open end of the hollow spherical portion 4 fitted outside and the outside face of the hollow spherical portion 3 fitted inside, lip portion 7 and 8 formed at both sides of the cross-section hollow portion 6 are respectively joined to the open end face 4a of the hollow spherical portion 4 fitted outside and to the outside face of the hollow spherical portion 3 fitted inside, and a holding member 9 attached to the open end 4a of the hollow spherical portion 4 fitted outside is joined to the outside face of the packing 5 so as to hold the packing 5 in a predetermined set state.

As described above, it is obvious that the tubes 1 and 2 having the hollow spherical portions 3 and 4 can be formed into a relatively-short joint structure by forming a connection portion 11 or 12 like a flange at both ends of the tubes 1 and 2 respectively. To secure higher flexibility and retractility, it is necessary to realize a joint structure by combining more than one joint comprising the hollow spherical portions 3 and 4 as shown in FIG. 1. That is, to secure high-enough flexibility and retractility, more than one joint comprising the hollow spherical portions 3 and 4 are combined as shown in FIG. 1, an outside tube end 21 obtained by increasing the diameter of either of the tubes 1 and 2 is provided between the hollow spherical portions 3 and 4, the other tube end is accommodated in the outside tube end 21 as an inside tube end 22, a packing 15 formed as a cross-section hollow portion 16 is received by a holding seat 13 provided at the inside tube end 22, the outside lip portion 17 of the packing 15 is joined and sealed to the inside face of the outside tube end 21, and moreover a stopper 20 engaged with the holding seat 13 is provided at the outside tube end 21, so that the packing 15 can be replaced by properly removing the outside tube 21 with a fixing member 19.

That is, it is obvious that the structure in FIG. 1 has large extensibility and flexibility because a proper extensibility is stored in the inside and outside tube ends 21 and 22 within the interval range between the stopper 20 and the holding seat 13 and moreover, the hollow spherical portion 3 and 4 provided at both sides of the inside and outside tube ends 21 and 22 can respectively obtain a proper flexibility.

Figure 2:
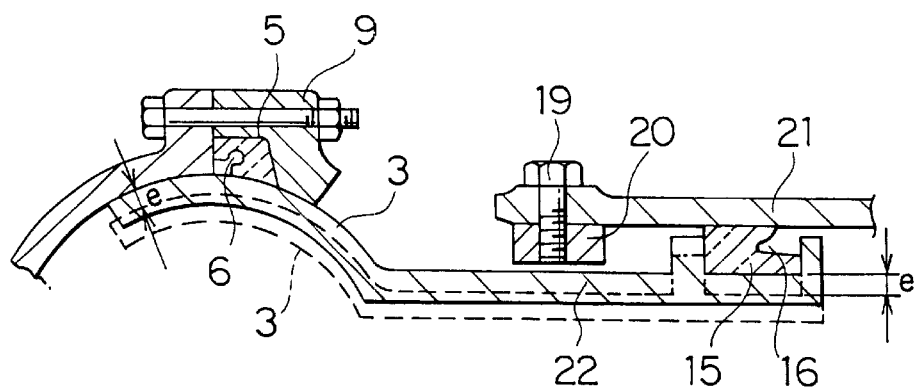
FIG. 2 is a partial sectional view showing the operation of an essential portion of the extensible flexible joint shown in FIG. 1.

Moreover, the above-described packings 5 and 15 of the present invention, as shown in FIG. 2 automatically follow even if the inside tube end 22 deviates by a gap e between the holding side and the sealing surface of the packing 5 or 15, keep an accurate sealing state as an automatic seal, and are able to always effectively keep the sealing state because the inside fluid pressure exerts on the hollow recesses 6 and 16 which are lumens of the packings 5 and 15. Therefore, it is possible to keep a preferable sealing relation without strongly pressing the packings 5 and 15. Moreover, because the packings 5 and 15 are not strongly pressed, deterioration or aging of the packings can be prevented and the durability of the entire joint mechanism can be greatly improved.

Figure 3:
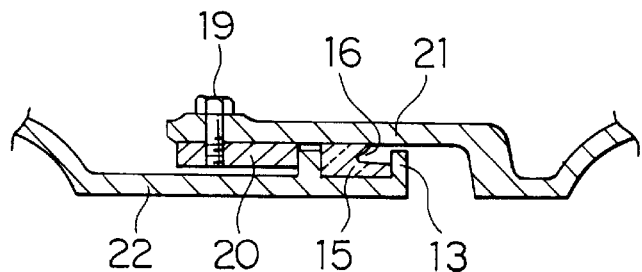
FIG. 3 is a partly sectional view showing a state in which the extension and contraction value of the extensible flexible joint in FIG. 2 is adjusted.

Furthermore, as previously described, it is possible to properly limit an adequate extension action when occasion demands and its mode is separately shown in FIG. 3. That is, the stopper 20 divided into two pieces fixed by the fixing member 19 can be properly replaced. By providing the broad stopper 20 as shown in FIG. 3, it functions as an extension/contraction limit stopper. Therefore, it is possible to obtain a mechanism which does not extend and contract or whose extension and contraction is properly limited.

Figure 4:
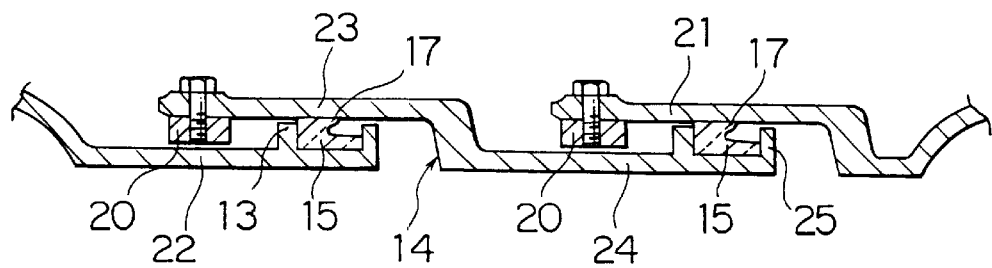
FIG. 4 is a partly sectional view of an extensible flexible joint of the present invention using an extension adapter.

The structure shown in FIG. 4 can be realized separately from the structure of the present invention. That is, the above-mentioned extensible flexible joint is constituted by using an intermediate fitting tube 14 whose one end is used as an outside fitting portion 23 and whose other end is formed on an inside fitting portion 24, fitting the packing 15 whose cross section is formed to be hollow into a holding seat 25 formed at the end of the tube 14 and the holding seat 13 formed on the inside tube end 22 respectively, the outside lip portions of these packings 15 are joined to the outside fitting portion 23 and the outside tube end 21 respectively, and moreover the stopper 20 engaged with the packing holding seat 13 or 25 is provided.

That is, in the structure shown in FIG. 4, the both ends of the intermediate fitting tube 14 can make a large extension or contraction. Moreover, because two intermediate fitting tubes 14 or more can be coaxially coupled consecutively, it is possible to obtain a greatly increased extension or contraction value in accordance with the occasion.

Figure 5:
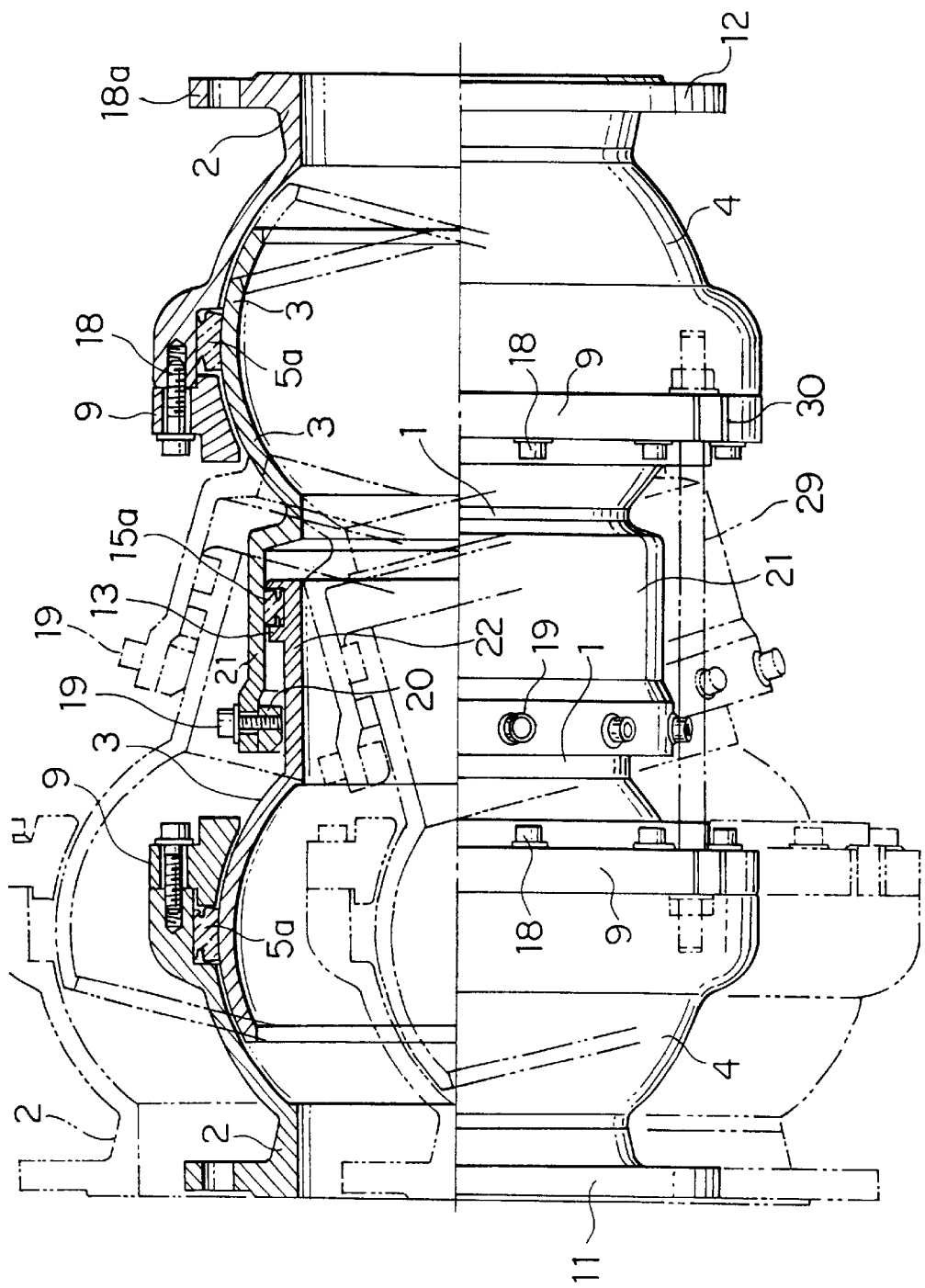
FIG. 5 is a sectional view showing a second structure of the present invention, similarly to FIG. 1.
Figure 6:
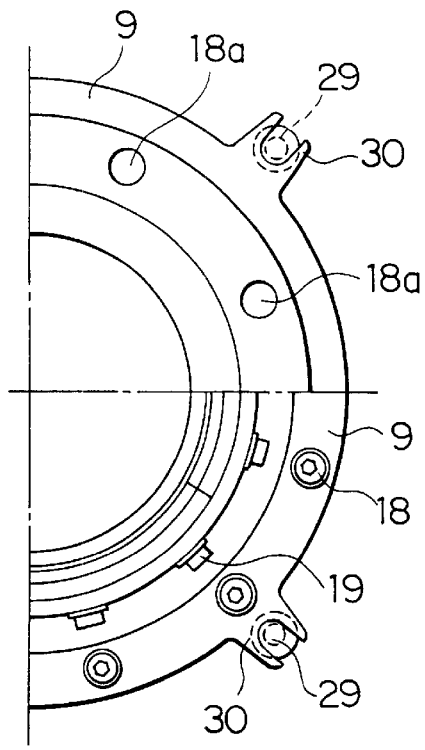
FIG. 6 is a partly end-face view of the structure shown in FIG. 5.
Figure 7:
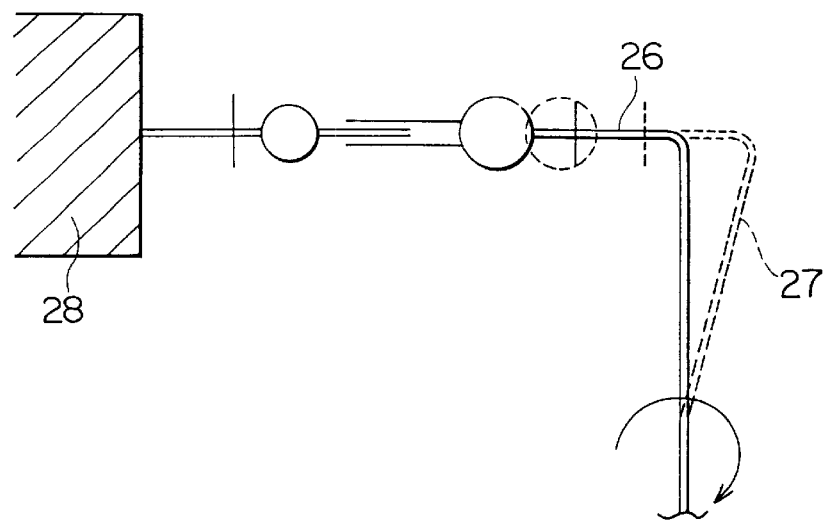
FIG. 7 is an illustration showing a mode in which a bending force is produced in the conduit when using a joint of the present invention.

FIGS. 5 and 6 show, as the second mode of the present invention, an example in which packings 5a and 15a provided to the hollow spherical portions 3 and 4 fitted inside and outside and/or inside and outside tube ends 21 and 22 are formed so that recessed portions 31 facing to each other are formed from the side in section. The holding member 9 is provided to the outside hollow spherical portion 4 to hold the packing 5a or 15a. The relation between the packings 5a and 15a is as follows. One provided between the inside and outside tube ends 21 and 22 is larger than one shown in FIG. 1 joined to the hollow spherical portion 3 in the case of the structure of FIG. 1, while the packing 15a provided between the inside and outside tube ends 21 and 22 is made smaller than the packing 5a in the case of the structure of FIG. 5.

That is, when using the structures of FIGS. 5 and 6, it is necessary to increase the sealing area (sealing width) at the vertical open end 4a because the sealing surface with the open end 4a at the hollow spherical portion 4 of the packing 5 is vertical to the spherical surface and hence, it is unavoidable that the outside diameter of the hollow spherical portion 4 increases. In the case of the structure of FIG. 5, however, the packings 5a and 15a are pressed and deformed in the thickness direction and sealing at the surface vertical to the spherical surface is not required and therefore, the diameter of the spherical portion can be decreased.

Moreover, in the case of the structures of FIGS. 5 and 6, it is unnecessary to consider the direction of the packings when the joint is assembled because the cross sections of the packings 5a and 15 are symmetric and moreover, it is unnecessary to preform sealing by contracting the both spherical portions 3 and 4 and pressing the packings 5a and 15a. Therefore, it is possible to greatly simplify the assembling operation from any point of view. Consequently, it is the same as the cases of FIGS. 1 to 4 above described that the sealing action using the change of pressure such as the internal pressure in the case of the packings 5a and 15a. Resultingly, because lip portions are so formed at both sides as to face to each other, the advantages that an automatic seal effectively following up the variation of internal and external pressures can be formed and a preferable sealing relation can be secured under the condition of the simple assembling operation can be obtained at the inside and outside of a conduit.

Moreover, in the case of the structure on FIG. 1, the holding member 9 for supporting the packing is extracted in the tensile force acting direction when a tensile load exerts on the joint in the tube axis direction and therefore, the sealing performance between the packing 5 and the holding member 9 is deteriorated. However, the structure of FIG. 5 has an advantage that the same sealing performance as the above can be secured even when the above tensile force acts.

In the case of the structure of the present invention for forming a sealing relation without pressing the packings 5a and 15a, extension and bend can be obtained in a free state. This shows that deforming direction and amount increase even by using both hands at the time of manipulation and the handling difficulty increases when the structure is formed with four portion bodies as illustrated. Therefore, as shown in FIGS. 5 and 6, it is preferable to protrude a plurality of seat securing portions 30 from the holding members 9 and 9 respectively, insert and tighten a temporarily-securing bolt 29 to fix the both holding members 9 and 9 and bring them into a setting position, and thereafter remove the temporarily-securing bolt 29.

In the case of the above structure of the present invention, hollow spherical portions formed at tube ends so provided as to face to each other are fitted inside and outside and coupled so that the tubes can be mutually bent, in which an effective sealing state is realized by setting a packing on which a recess portion is formed from the side face in section between the open end of the hollow spherical portion fitted outside and the outside face of the hollow spherical portion fitted inside, joining a lip portion formed at least on one side of the recessed portion to the open end face of the hollow spherical portion fitted outside, and joining a holding member provided to open end of the hollow spherical portion fitted outside to the packing and thereby, applying the pressure of fluid flowing through the tubes to a hollow portion of the packing. Therefore, sealing is realized without strongly pressing the packing, the durability of the packing is improved, and extensibility and flexibility are properly secured.

By joining the holding member provided to the open end of the hollow spherical portion fitted outside to the outside face of the above packing, the packing can be held by the outside face of the hollow spherical portion fitted inside in a proper state.

By forming a packing in which a recessed portion is formed from the side in section so that the cross section of the packing become hollow and joining a lip portion formed at both sides of the hollow recessed portion respectively to the open end face of a hollow spherical portion fitted outside and the outside face of a hollow spherical portion fitted inside, and thereby applying the pressure of fluid in the tube to the inside of the recessed portion, a preferable sealing characteristic can be secured.

By providing a packing in which recessed portions are so formed from both side faces as to face to each other between the open end of a hollow spherical portion fitted outside and the outside face of a hollow spherical portion fitted inside and joining a holding member provided to the open end of the hollow spherical portion fitted outside to one side of the packing so that the holding member for supporting the packing is not extracted in the tensile force exerting direction even if a tensile load in the axial direction of the connected conduit, a stable sealing characteristic can be secured even when the above tensile force acts.

An adequate flexible action and an adequate extension action can be obtained by setting more than one extensible flexible joint described above, forming either of the opposed tube ends of the extensible flexible joints into a large-diameter outside tube end, storing the other tube end as an inside tube end, providing a packing so formed that its cross section becomes hollow in a holding seat provided for the inside tube end, joining and sealing the outside lip portion of the packing to the inside face of the outside tube end, and moreover providing a stopper secured to the holding seal for the outside tube end.

High-enough flexibility and extensibility can be obtained by coupling a plurality of extensibility flexible joints having the above structure, whose one side is used as an outside fitting portion and whose other side is used as an inside fitting portion to each other through an intermediate fitting tube, providing a packing so formed that its cross section becomes hollow in each holding seat formed on the inside fitting portion, joining the outside lip portion of the packing to the inside face of the outside fitting portion, and providing a stopper secured to the packing holding seat for the outside fitting portion. Moreover, a universal extensible flexible joint mechanism can be formed by properly using a plurality of intermediate fitting tubes.

Industrial Applicability of the Invention

As described above, the present invention has advantages of realizing an accurate sealing state without strongly pressing a packing and therefore realizing a smooth flexible action or extension, adequately improving the durability of the packing, preventing an unnecessary bending force from occurring in the conduit by controlling the extension and contraction value of the packing, and moreover realizing proper flexibility and extensibility by keeping a stable sealing action even when a tensile force acts in the tube axis direction. Therefore, the present invention is an invention having a large industrial advantage.

What is claimed is:

1. An extensible flexible joint wherein hollow spherical portions formed at ends of first and second opposed tubes are fitted to each other inside and outside so as to couple the first and second opposed tubes in a manner such that the first and second opposed tubes can be bent, said joint comprising:

a packing in which two opposed recessed portions are formed, said packing being provided between an open end face of the hollow spherical portion fitted outside and an outside section of the hollow spherical portion fitted inside;

at least one lip portion formed on each of the recessed portions; and a holding member coupled to the open end face of the hollow spherical portion fitted outside so as to hold the packing between the open end face of the hollow spherical portion fitted outside and the outside section of the hollow spherical portion fitted inside;

wherein:

at least one of the first and second opposed tubes comprises a holding seat provided at a tube end portion opposite the hollow spherical portion thereof;

said holding seat is adapted to accommodate another packing having opposed recessed portions formed therein;

said another packing is adapted to form a seal with a third tube to be fitted to said one of the first and second opposed tubes;

said third tube comprises a stopper adapted to be engaged with the packing holding seat of said one of the first and second opposed tubes; and said stopper is held in place on said third tube by a removable fixing member, and said stopper is selected to have a length in accordance with a desired extensibility between said third tube and said one of the first and second opposed tubes to which said third tube is to be fitted.

2. The extensible flexible joint according to claim 1, wherein said holding member comprises at least one seat securing portion adapted to accommodate a temporarily-securing bolt.

3. An extensible flexible joint wherein hollow spherical portions formed at ends of first and second opposed tubes are fitted to each other inside and outside so as to couple the first and second opposed tubes in a manner such that the first and second opposed tubes can be bent, said joint comprising:

a packing in which two opposed recessed portions are formed, said packing being provided between an open end face of the hollow spherical portion fitted outside and an outside section of the hollow spherical portion fitted inside;

at least one lip portion formed on each of the recessed portions; and a holding member coupled to the open end face of the hollow spherical portion fitted outside so as to hold the packing between the open end face of the hollow spherical portion fitted outside and the outside section of the hollow spherical portion fitted inside;

wherein:

at least one of the first and second opposed tubes comprises a holding seat provided at a tube end portion opposite the hollow spherical portion thereof;

said holding seat is adapted to accommodate another packing having opposed recessed portions formed therein;

said another packing is adapted to form a seal with an intermediate fitting tube to be fitted to said one of the first and second opposed tubes;

said intermediate fitting tube comprises a stopper adapted to be engaged with the packing holding seat of said one of the first and second opposed tubes; and said stopper is held in place on said intermediate fitting tube by a removable fixing member, and said stopper is selected to have a length in accordance with a desired extensibility between said intermediate fitting tube and said one of the first and second opposed tubes to which said intermediate fitting tube is to be fitted.

4. The extensible flexible joint according to claim 3, wherein said holding member comprises at least one seat securing portion adapted to accommodate a temporarily-securing bolt.

* * * * *